US006109757A

United States Patent [19]
Stephens

[11] Patent Number: 6,109,757
[45] Date of Patent: Aug. 29, 2000

[54] CASE LIGHT ASSEMBLY SYSTEM

[76] Inventor: Owen Stephens, 1891 S. Ocean Dr., No. 103, Hallandale, Fla. 33009

[21] Appl. No.: 09/286,058

[22] Filed: Apr. 5, 1999

Related U.S. Application Data

[63] Continuation-in-part of application No. 08/852,901, May 8, 1997, Pat. No. 5,890,793.

[51] Int. Cl.[7] ...................................................... F21K 5/00
[52] U.S. Cl. ................................ 362/11; 362/18; 362/16; 362/225; 362/240; 362/241
[58] Field of Search ................................. 362/11, 16, 18, 362/216, 225, 235, 236, 240, 241, 21, 210

[56] References Cited

U.S. PATENT DOCUMENTS 5,720,546  2/1998  Correll, Jr. et al. ..................... 362/221
5,720,610  2/1998  Stephenson ............................... 362/11

*Primary Examiner*—Sandra O'Shea
*Assistant Examiner*—Anabel M. Ton

[57] ABSTRACT

A case light assembly system with alternate illumination sources. A case has a lower plate with an upper supporting surface and a lower surface and with upstanding peripheral side walls to define a reception area therewithin. A plate is formed to overlie the lower plate, the plate having a central downwardly extending articulated mounting adapter. A harness-retaining frame is formed of two long parallel side walls and two parallel end walls in a rectangular configuration. A ballast assembly includes a removable ballast carrier with an open top and chamber therewithin, a switch plate thereabove, and a heat exchange plate to one side of the switch plate. The ballast assembly has a plug fixture thereebeneath for coupling with the source of electrical potential.

4 Claims, 4 Drawing Sheets

CASE LIGHT ASSEMBLY SYSTEM

RELATED APPLICATION

The present invention is a continuation-in-part application of co-pending application U.S. Ser. No. 08/852,901 filed May 8, 1997 now U.S. Pat. No. 5,890,793.

BACKGROUND OF THE INVENTION

1. Field of the Invention

The present invention relates to a new and improved case light assembly with alternate illumination sources and, more particularly, pertains to allowing for the rapid change of lighting during photography, video, television and motion picture production as necessitated by ambient lighting conditions.

2. Description of the Prior Art

The use of sources of illumination of known designs and configurations is known in the prior art. More specifically, sources of illumination of known designs and configurations heretofore devised and utilized for the purpose of modifying a source of illumination to meet the needs of a particular site through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of sources of illumination of known designs and configurations. By way of example, the prior art includes U.S. Pat. No. 5,253,152 to Yang and So, which discloses a lightweight plug-in fluorescent lamp assembly. The lamp assembly will rest upon the existing support grid of a false ceiling or be attached directly to the ceiling in a surface mounted arrangement.

U.S. Pat. No. 5,253,497 to Costa discloses a luminescent fixture providing directed lighting for television, video, and film production. The luminescent fixture provides sustained illumination by including a plurality of parallel mercury vapor luminescent lamp tubes aligned in close proximity in a common plane bisecting an arcuate concave angle defined by high reflective facing surfaces of a pair of longitudinal reflector panels.

U.S. Pat. No. 5,132,885 to Hocheim and Swirk and assigned to Kino Flo, Inc. discloses a portable fluorescent lighting system for use in location photography, and television and motion picture filming. The system comprises an extremely light weight corrugated plastic panel made into five subpanels by removing two flutes of the corrugation out to provide for hinging. At least one elongated florescent light source is placed on the center subpanel and the other four subpanels are used to control the direction of or limit the output of the fluorescent light as well as act as an enclosure box.

U.S. Pat. No. 5,088,015 to Baggio and Burrows and assigned to Woodhead Industries, Inc. discloses a portable fluorescent lamp fixture for use in coupling with other similar fixtures in a series. The portable fluorescent lamp fixture includes an elongated center channel extending substantially the entire length of the fixture and disposed intermediate a pair of fluorescent lamps for providing a high strength, rugged structure.

U.S. Pat. No. 5,012,396 to Costa discloses a method of apparatus for illuminating television studio and video tape production facilities and method of generating a light source suitable for television studios or video production facilities with high speed florescent lighting devices.

U.S. Pat. No. 4,814,958 to Hsieh discloses a straight type fluorescent lamp device with light reflecting plates. The lamp device has reflecting plates, its body is made by direct extrusion, and it can be cut into any desired length to match with straight-type fluorescent tubes of any length specification and tube holders.

U.S. Pat. No. 4,782,428 to Lowell, Calamai, Doll marks Pronputhsri and Seligman, discloses a collapsible fluorescent light for photography to provide a balance to fluorescent ceiling lights.

U.S. Pat. No. 4,669,033 to Lee and assigned to Specuflex, Inc. discloses an adjustable optical reflector for a fluorescent fixture. The adjustable specular reflector is adapted for use in existing fluorescent lighting fixtures including a plurality of facets extending longitudinally and hingedly joined together.

Lastly, U.S. Pat. No. 3,852,582 to Lowell discloses a lighting arrangement for photographic work. This is a compact lighting arrangement for photographic work.

In this respect, the case light assembly system according to the present invention substantially departs from the conventional concepts and designs of the prior art, and in doing so provides an apparatus primarily developed for the purpose of allowing for the rapid change of lighting during photography, video, television and motion picture production as necessitated by ambient lighting conditions.

Therefore, it can be appreciated that there exists a continuing need for a new and improved case light assembly system which can be used for allowing for the rapid change of lighting during photography, video, television and motion picture production as necessitated by ambient lighting conditions. In this regard, the present invention substantially fulfills this need.

SUMMARY OF THE INVENTION

In view of the foregoing disadvantages inherent in the known types of sources of illumination of known designs and configurations now present in the prior art, the present invention provides a new and improved case light assembly system. As such, the general purpose of the present invention, which will be described subsequently in greater detail, is to provide a new and improved case light assembly system and methods which have all the advantages of the prior art and none of the disadvantages.

To attain this, the present invention essentially comprises a new and improved case light assembly system with alternate illumination sources to allow for rapid changes of lighting during photography, video, television and motion picture production as necessitated by ambient lighting conditions. The first major component of the system is a case in a generally rectilinear configuration having a lower plate with an upper supporting surface and a lower surface and with upstanding peripheral side walls to define a reception area therewithin. The base plate has a central rectangular opening and an plurality of spaced apertures adjacent to the edges thereof. A spider plate is formed with a central rectangular section and outstanding arms with apertures at the ends thereof to overlie the apertures of the lower plate, the spider plate having a central downwardly extending articulated mounting adapter. The next major component of the system is a harness-retaining frame formed of two long parallel side walls and two parallel end walls in a rectangular configuration adapted to fit within the reception area of the case. The frame has upper edges with hinges pivotally coupled therealong with generally rectangular reflective plates constituting an intensifier array and having lower edges secured to the hinges for coupling to the frame and movable between an inoperative position in an essentially common plane and an operative position extending upwardly and outwardly from the frame. The frame is further provided with downwardly extending legs adjacent to the corners with apertures therethrough aligned with the apertures of the supporting plate and the case with bolts coupling the supporting plate of the case and the frame together during operation and use. One end of the frame has a downwardly extending harness-retaining latch and an associated safety interlock switch to provide for interruption of electrical power in the event that the reversible harness is not latched in place. A further major component of the system is a ballast assembly including a removable ballast carrier in a generally rectilinear configuration with an open top and chamber therewithin with six individual ballast modules therein, a switch plate thereabove, and a heat exchange plate to one side of the switch plate. The ballast assembly has a hubble plug fixture therebeneath for coupling with the source of electrical potential. The ballast assembly is connected by an integral wiring harness. A reversible fluorescent lighting harness is the last major component of the system. The harness includes a pair of spacing harness frame pieces, each frame piece having a horizontal plate with apertures therethrough and inwardly facing spacers with apertures for supporting the harness frames in spaced relationship with each other. Each harness frame has an outwardly facing parabolic backing reflector formed of arcuate sections coupled along their lengths, each reflector having outwardly extending Y-shaped bulb retainer clips and six U-shaped bulbs secured within the clips, the bulb assembly on one side containing T-5 bulb sets for daylight use and the other side with T-5 bulb sets of tungsten for other than daylight use. Each bulb has an electrical connector at its end in alignment for coupling with the source of potential.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved case light assembly system which has all the advantages of the prior art sources of illumination of known designs and configurations and none of the disadvantages.

It is another object of the present invention to provide a new and improved case light assembly system which may be easily and efficiently manufactured and marketed.

It is a further object of the present invention to provide a new and improved case light assembly system which is of a durable and reliable construction.

An even further object of the present invention is to provide a new and improved case light assembly system which is susceptible of a low cost of manufacture with regard to both materials and labor, and which accordingly is then susceptible of low prices of sale to the consuming public, thereby making such a case light assembly system economically available to the buying public.

Even still another object of the present invention is to allow for the rapid change of lighting during photography, video, television and motion picture production as necessitated by ambient lighting conditions.

Lastly, it is an object of the present invention to provide a case light assembly system with alternate illumination sources. A case has a lower plate with an upper supporting surface and a lower surface and with upstanding peripheral side walls to define a reception area therewithin. A plate is formed to overlie the lower plate, the plate having a central downwardly extending articulated mounting adapter. A harness-retaining frame is formed of two long parallel side walls and two parallel end walls in a rectangular configuration adapted to fit within the reception area of the case. The frame has upper edges with hinges pivotally coupled therealong with generally rectangular reflective plates having lower edges secured to the hinges for coupling to the frame. The frame has downwardly extending legs adjacent to the corners, one end of the frame having a downwardly extending harness-retaining latch and an associated safety interlock switch to provide for interruption of electrical power in the event that the reversible harness is not latched in place. A ballast assembly is provided and includes a removable ballast carrier with an open top and chamber therewithin with a plurality of individual ballast modules therein, a switch plate thereabove, and a heat exchange plate to one side of the switch plate. The ballast assembly has a plug fixture therebeneath for coupling with the source of electrical potential. The ballast assembly is connected by an integral wiring harness. A reversible fluorescent lighting harness includes a pair of spacing harness frame pieces, each frame piece having a horizontal plate. Each harness frame has an outwardly facing parabolic backing reflector formed of arcuate sections coupled along their lengths. Each reflector has outwardly extending bulb retainer clips and a plurality of U-shaped bulbs secured within the clips. The bulb assembly on one side containing a first bulb set for daylight use and the other side with a second bulb set. Each bulb has an electrical connector at its end in alignment for coupling with the source of potential.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 4:
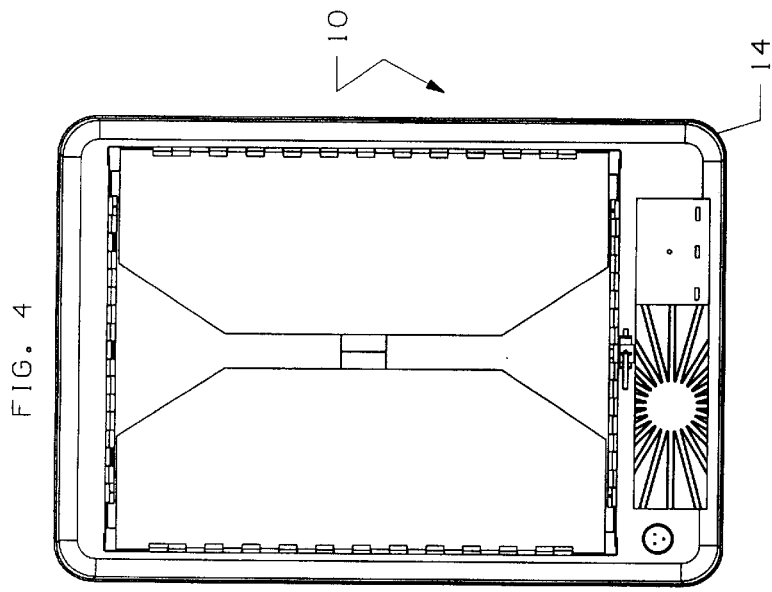
FIG. 4 is a top elevational view of the system shown in FIG. 1.
Figure 3:
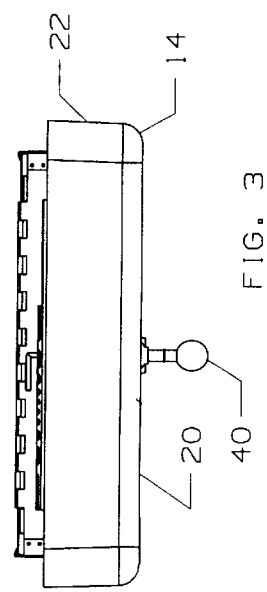
FIG. 3 is an end elevational view of the system shown in FIG. 1.
Figure 1:
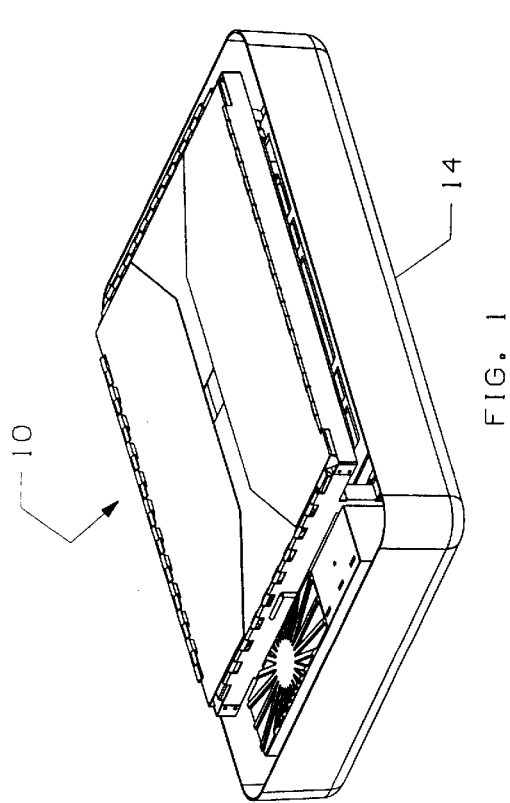
FIG. 1 is a perspective illustration of the new and improved case light assembly system constructed in accordance with the principles of the present invention.
Figure 2:
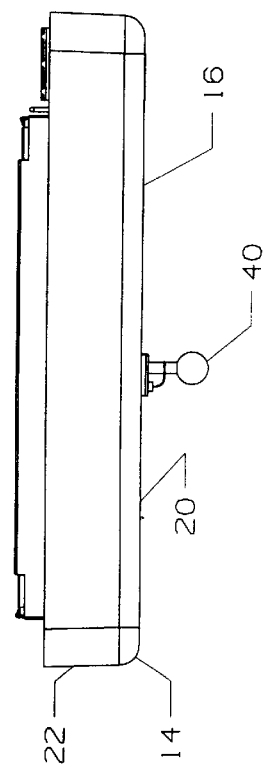
FIG. 2 is a side elevational view of the system shown in FIG. 1.
Figure 5:
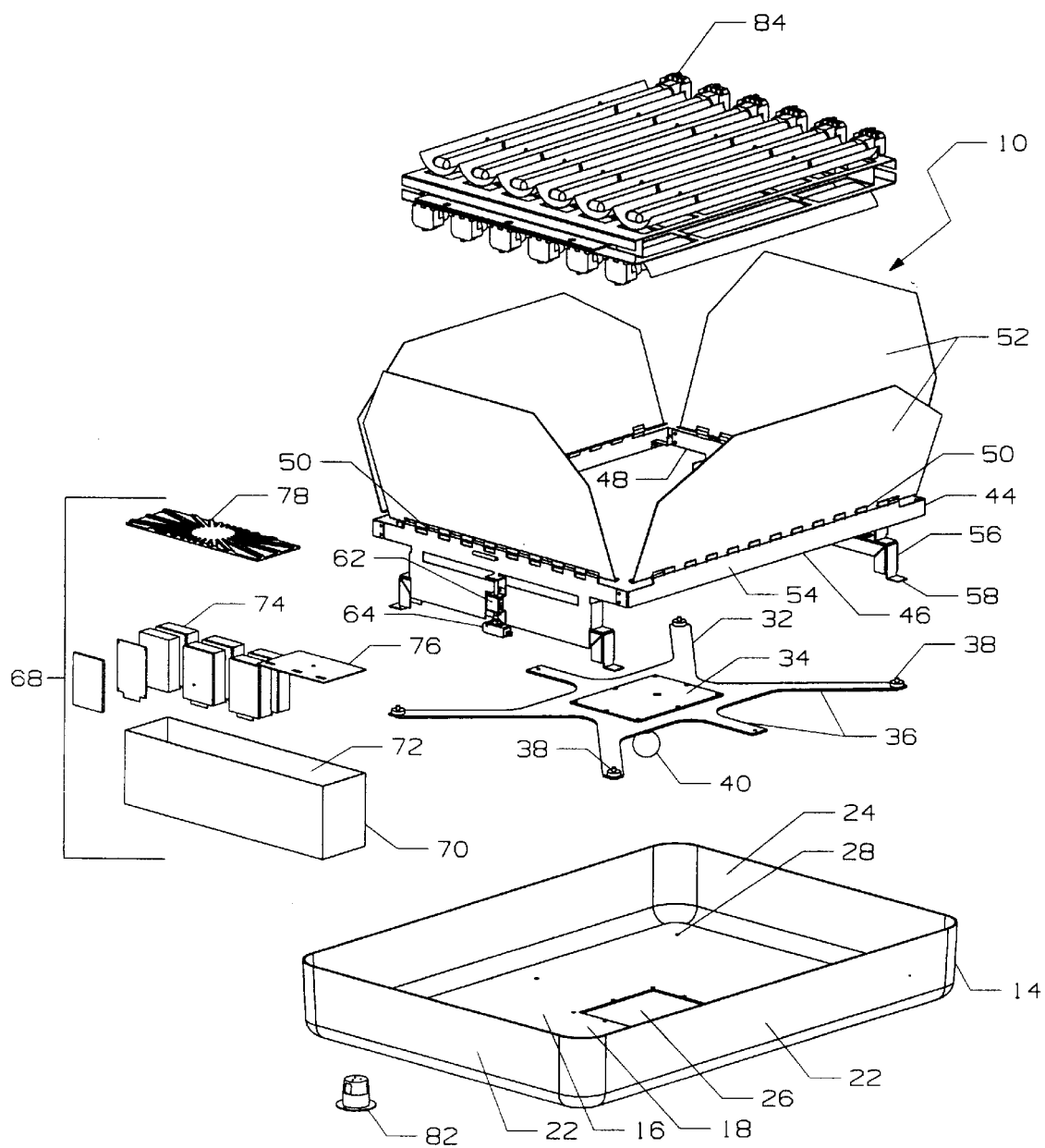
FIG. 5 is an exploded perspective view of the system shown in FIGS. 1 through 4.
Figure 6:
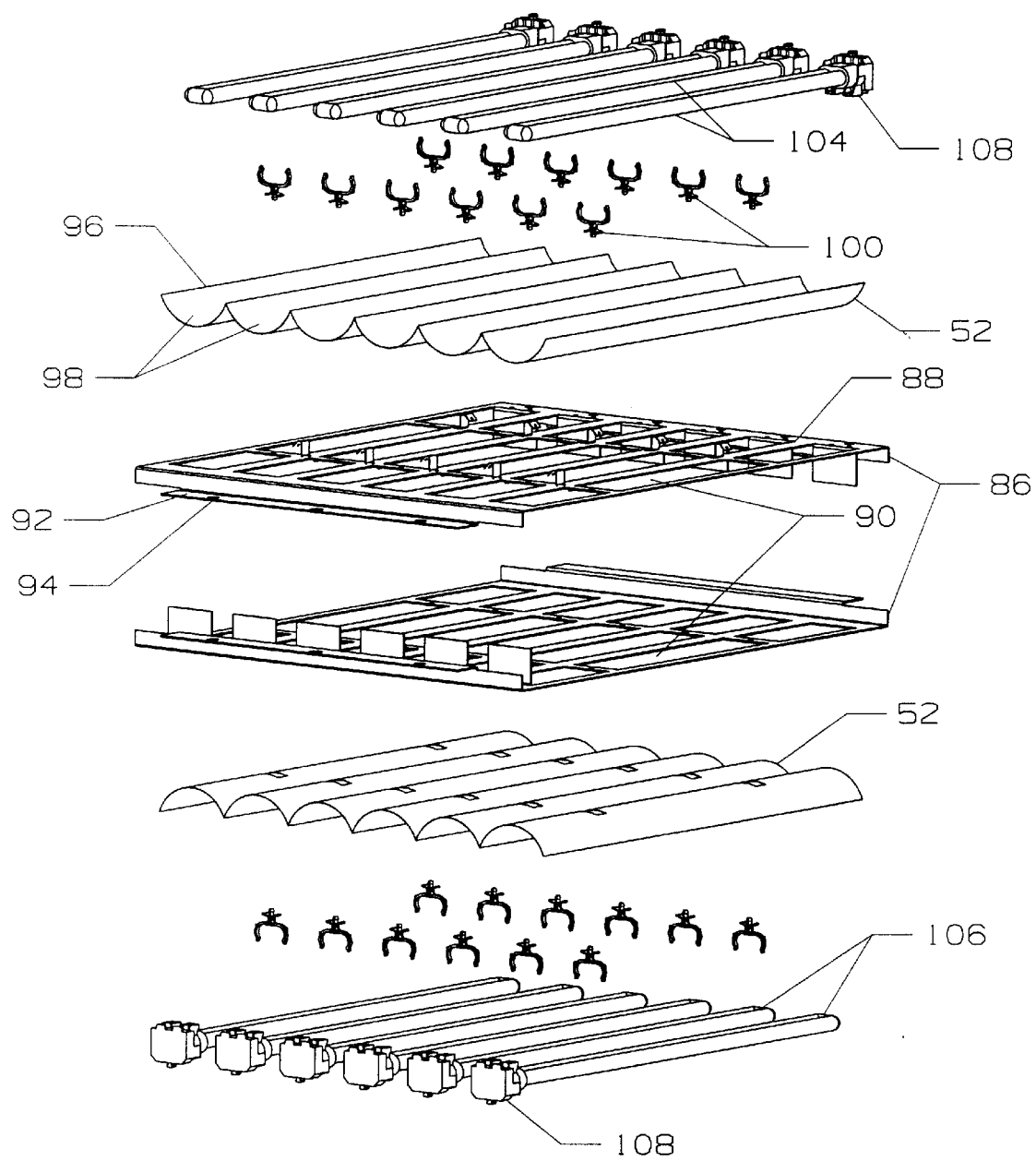
FIG. 6 is an exploded perspective view of the reversible florescent lighting harness shown in FIG. 5.

With reference now to the drawings, and in particular to FIGS. 1 through 7 thereof, the preferred embodiment of the new and improved case light assembly system embodying the principles and concepts of the present invention and generally designated by the reference numeral 10 will be described.

The present invention, the new and improved case light assembly with alternate illumination sources, is a system 10 comprised of a plurality of components. Such components, in their broadest context, include a case, a plate, a frame, a ballast assembly, and a lighting harness. Each of the individual components is specifically configured and correlated one with respect to the other so as to attain the desired objectives.

The present invention discloses a system with alternate illumination sources to allow for rapid changes of lighting during photography, video, television and motion picture production as necessitated by ambient lighting conditions. The device consists of a symmetrical, two-sided lighting harness incorporating two full sets of fluorescent lighting globes of different color temperatures, on set being fitted with daylight color temperature tubes and the other set being fitted with tungsten color temperature tubes. The backing reflectors are integral to the device. Wiring to the bulb arrays, arcuate backing reflectors, is also integral to the device, and said wiring leads to a multi-pin plug allowing the wiring to be easily disconnected in one operation. All of the above is fitted to a self-contained backing frame which attaches to a base plate and reflector array integral to the light housing as a whole. Provision is made for quick release of the harness form the light housing which allows for rapid changeover from daylight to tungsten light output. The harness also protects the installed bulbs from damage during changeover due to misaligned pins, bulbs broken by being dropped by the operator, and tubes broken due to hard contact with other tubes.

The first major component of the system is a case 14. The case is formed in a generally rectilinear configuration with a lower plate 16 with an upper supporting surface 18 and a lower surface 20 and with upstanding peripheral side walls 22 to define a reception area 24 therewithin. The base plate has a central rectangular opening 26 and an plurality of spaced apertures 28 adjacent to the edges thereof.

A further component of the system is a spider plate 32. The spider plate is formed with a central rectangular section 34 and outstanding arms 36 with apertures 38 at the ends thereof to overlie the apertures of the lower plate. The spider plate has a central downwardly extending articulated mounting adapter 40.

The next major component of the system is a harness-retaining frame 44. The frame is formed of two long parallel side walls 46 and two parallel end walls 48 in a rectangular configuration adapted to fit within the reception area of the case. The frame has upper edges with hinges 50 pivotally coupled therealong with generally rectangular reflective plates 52 constituting an intensifier array. The frame further has lower edges 54 secured to the hinges for coupling to the frame and movable between an inoperative position in an essentially common plane and an operative position extending upwardly and outwardly from the frame. The frame is further provided with downwardly extending legs 56 adjacent to the corners with apertures 58 therethrough aligned with the apertures of the supporting plate and the case with bolts coupling the supporting plate of the case and the frame together during operation and use. One end of the frame has a downwardly extending harness-retaining latch 62 and an associated safety interlock switch 64 for providing electrical power.

Next provided as a component of the system is a ballast assembly 68. The ballast assembly includes a removable ballast carrier 70 in a generally rectilinear configuration with an open top and chamber 72 therewithin with six individual ballast modules 74 therein, a switch plate 76 thereabove, and a heat exchange plate 78 to one side of the switch plate. The individual ballast modules are designed for rapid removal and replacement as needed. The ballast assembly also has a hubble plug fixture 80 therebeneath for coupling with the source of electrical potential, a universal power supply.

The last major component of the system is a reversible fluorescent lighting harness 84. The harness includes a pair of spacing harness frame pieces 86. Each frame piece has a horizontal plate 88 with apertures 90 therethrough and inwardly facing spacers 92 with apertures 94 for supporting the harness frames in spaced relationship with each other. There are in effect two wiring harness assemblies. One is resident within the case. The other is aligned with the reflectors within the reversible lighting harness. These are connected with the multi-pin plug which allows further rapid reversal of the harness. Each harness frame has an outwardly facing parabolic backing reflector 96 formed of arcuate sections 98 coupled along their lengths. Each reflector has outwardly extending Y-shaped bulb retainer clips 100 and six U-shaped bulbs secured within the clips, the bulb assembly on one side containing T-5 bulb sets 104 for daylight use and the other side with T-5 bulb sets 106 of tungsten for other than daylight use. Each bulb has an electrical connector 108 at its end in alignment for coupling with the source of potential.

For changing the bulbs to be utilized for a particular application, the reversible lighting harness is first unplugged, then pulled out of the housing, manually reversed, then pushed back into the housing, and then, finally, replugged for immediate use.

Figure 7:
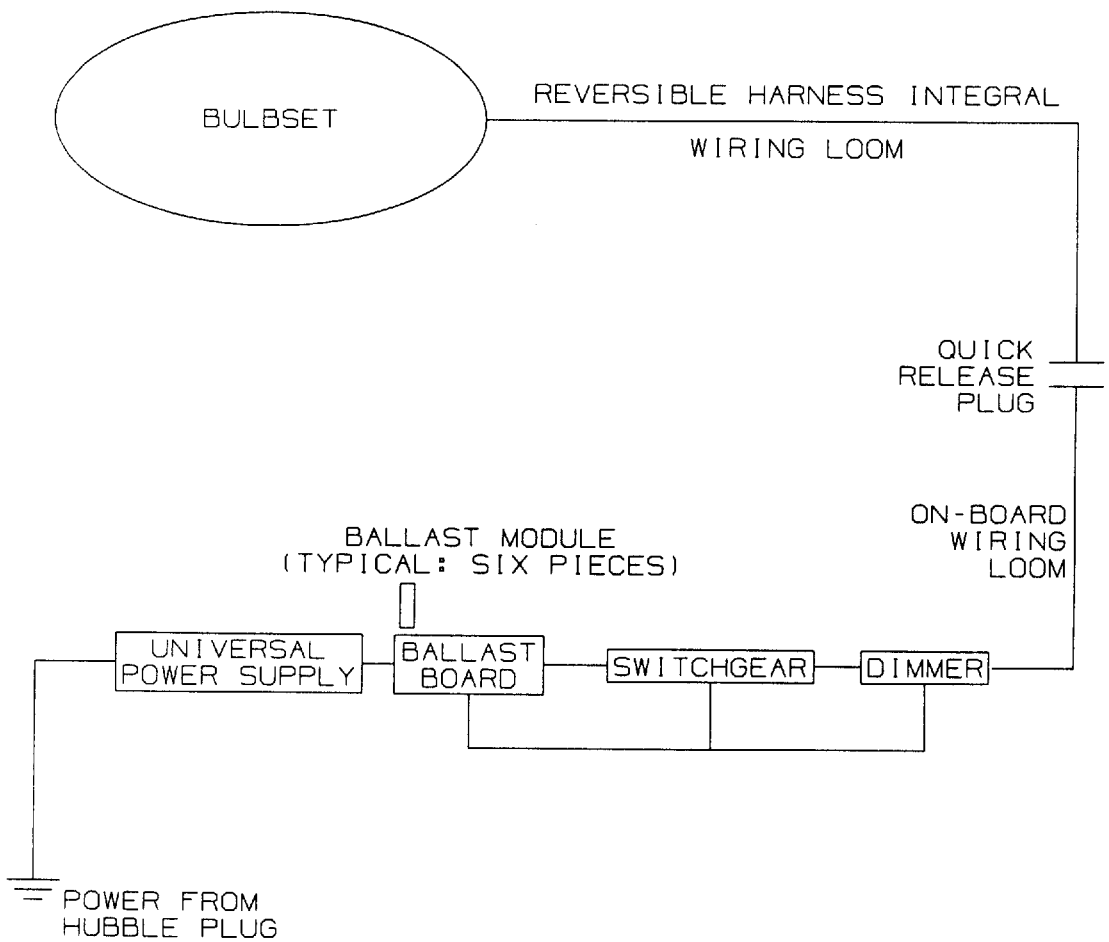
FIG. 7 is an electrical schematic of the system shown in the prior Figures.

Shown in FIG. 7 is an electrical schematic of the system of the present invention. From the upper left there is shown the bulb set being powered with a reversible harness integral wiring loom coupled to one component of a quick-release plug. The other portion of the quick-release plug extends through the onboard wiring loom to a dimmer. The dimmer is preferably a rheostat to allow for adjusting the extent of illumination. In line with the dimmer is the switch gear and then the ballast board with the plurality, preferably six, pieces of the ballast module in the ballast board. A supplemental line couples the ballast module, switch gear and dimmer and constitutes a feed back control loop. Next in line with the ballast board is the universal power supply with a line coupled to the source of power through the hubble plug.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A case light assembly system with alternate illumination sources to allow for rapid changes of lighting during photography, video, television and motion picture production as necessitated by ambient lighting conditions comprising, in combination:

a case in a generally rectilinear configuration having a lower plate with an upper supporting surface and a lower surface and with upstanding peripheral side walls to define a reception area therewithin, the base plate having a central rectangular opening and an plurality of spaced apertures adjacent to the edges thereof;

a spider plate formed with a central rectangular section and outstanding arms with apertures at the ends thereof to overlie the apertures of the lower plate, the spider plate having a central downwardly extending articulated mounting adapter;

a harness-retaining frame formed of two long parallel side walls and two parallel end walls in a rectangular configuration adapted to fit within the reception area of the case, the frame having upper edges with hinges pivotally coupled therealong with generally rectangular reflective plates constituting an intensifier array and having lower edges secured to the hinges for coupling to the frame and movable between an inoperative position in an essentially common plane and an operative position extending upwardly and outwardly from the frame, the frame having downwardly extending legs adjacent to the corners with apertures therethrough aligned with the apertures of the supporting plate and the case with bolts coupling the supporting plate of the case and the frame together during operation and use, one end of the frame having a downwardly extending harness-retaining latch and an associated safety interlock switch to provide for interruption of electrical power in the event that the reversible harness is not latched in place;

a ballast assembly including a removable ballast carrier in a generally rectilinear configuration with an open top and chamber therewithin with six individual ballast modules therein, a switch plate thereabove, and a heat exchange plate to one side of the switch plate, the ballast assembly having a hubble plug fixture thereneath for coupling with the source of electrical potential; and a reversible fluorescent lighting harness including a pair of spacing harness frame pieces, each frame piece having a horizontal plate with apertures therethrough and inwardly facing spacers with apertures for supporting the harness frames in spaced relationship with each other, each harness frame having an outwardly facing parabolic backing reflector formed of arcuate sections coupled along their lengths, each reflector having outwardly extending Y-shaped bulb retainer clips and six U-shaped bulbs secured within the clips, the bulb assembly on one side containing T-5 bulb sets for daylight use and the other side with T-5 bulb sets of tungsten for other than daylight use, each bulb having an electrical connector at its end in alignment for coupling with the source of potential.

2. A case light assembly system with alternate illumination sources comprising:

a case having a lower plate with an upper supporting surface and a lower surface and with upstanding peripheral side walls to define a reception area therewithin;

a plate formed to overlie the lower plate, the plate having a central downwardly extending articulated mounting adapter;

a harness-retaining frame formed of two long parallel side walls and two parallel end walls in a rectangular configuration adapted to fit within the reception area of the case, the frame having upper edges with hinges pivotally coupled therealong with generally rectangular reflective plates having lower edges secured to the hinges for coupling to the frame, the frame having downwardly extending legs adjacent to the corners, one end of the frame having a downwardly extending harness-retaining latch and an associated safety interlock switch to provide for interruption of electrical power in the event that the reversible harness is not latched in place;

a ballast assembly including a removable ballast carrier with an open top and chamber therewithin with a plurality of individual ballast modules therein, a switch plate thereabove, and a heat exchange plate to one side of the switch plate, the ballast assembly having a plug fixture thereneath for coupling with the source of electrical potential; and a reversible fluorescent lighting harness including a pair of spacing harness frame pieces, each frame piece having a horizontal plate, each harness frame having an outwardly facing parabolic backing reflector formed of arcuate sections coupled along their lengths, each reflector having outwardly extending bulb retainer clips and a plurality of U-shaped bulbs secured within the clips, the bulb assembly on one side containing a first bulb set for daylight use and the other side with a second bulb set, each bulb having an electrical connector at its end in alignment for coupling with the source of potential.

3. The case light assembly system as set forth in claim 2 wherein one bulb set is of tungsten for other than daylight use.

4. The case light assembly system as set forth in claim 2 wherein the harness has two sets of bulbs with bulbs in each set.

* * * * *